United States Patent
Choi (10) Patent No.: US 8,352,987 B2
(45) Date of Patent: Jan. 8, 2013

(54) METHOD FOR SCHEDULED-RECORDING OF PROGRAM AND IMAGE DISPLAY APPARATUS USING THE SAME

(75) Inventor: Seok-chool Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 420 days.

(21) Appl. No.: 11/790,367

(22) Filed: Apr. 25, 2007

(65) Prior Publication Data

US 2008/0120651 A1 May 22, 2008

(30) Foreign Application Priority Data

Nov. 21, 2006 (KR) .................. 10-2006-0115274

(51) Int. Cl.
*H04W 7/025* (2006.01)
*H04W 7/10* (2006.01)
(52) U.S. Cl. .............................. 725/53; 725/58
(58) Field of Classification Search ............... 725/37–61
See application file for complete search history.

(56) References Cited

U.S. PATENT DOCUMENTS

| | | | | |
|---|---|---|---|---|
| 6,865,746 | B1 * | 3/2005 | Herrington et al. ............. | 725/53 |
| 7,058,635 | B1 * | 6/2006 | Shah-Nazaroff et al. ...... | 707/100 |
| 2002/0174430 | A1 * | 11/2002 | Ellis et al. .................. | 725/46 |
| 2003/0200545 | A1 * | 10/2003 | Nakada ........................ | 725/53 |
| 2004/0123319 | A1 * | 6/2004 | Kim ............................. | 725/53 |
| 2005/0240963 | A1 * | 10/2005 | Preisman et al. ............... | 725/44 |
| 2006/0095543 | A1 * | 5/2006 | Ito et al. ...................... | 709/218 |
| 2006/0136966 | A1 * | 6/2006 | Folk ............................ | 725/58 |
| 2006/0140581 | A1 * | 6/2006 | Inoue et al. .................. | 386/83 |

FOREIGN PATENT DOCUMENTS

JP 2003-087675 3/2003

* cited by examiner

*Primary Examiner* — Vivek Srivastava
*Assistant Examiner* — Carmine Malangone
(74) *Attorney, Agent, or Firm* — Roylance, Abrams, Berdo & Goodman, L.L.P.

(57) ABSTRACT

A method for a scheduled-recording of a program and an image display apparatus using the same are provided. The method for a scheduled-recording of a program includes displaying a search menu for searching other programs related to a program being displayed, and scheduling the recording of at least one program from among programs searched according to search options selected from the search menu. Therefore, a scheduled-recording may be readily set without searching for each program separately from an electronic program guide screen, and thus, greater convenience is provided to the user.

28 Claims, 6 Drawing Sheets

| Reserve 1 | Item 1 | A | B | C |
|---|---|---|---|---|
| Reserve 2 | Item 2 | D | E | F |
| ⋮ | ⋮ | ⋮ | | |
| | | Y | Z | Sp |
| Reserve n | Item k | | | |

| CHANNEL | TITLE | DATE | TIME | RESERVATION |
|---|---|---|---|---|
| CH10 OCN | CSI SEASON 1 (EPISODE 1) | 2006.09.11 | 5:15PM | 0 |
| CH10 OCN | CSI SEASON 1 (EPISODE 2) | 2006.09.12 | 5:15PM | 0 |
| CH10 OCN | CSI SEASON 1 (EPISODE 3) | 2006.09.13 | 5:15PM | 0 |
| CH10 OCN | CSI SEASON 1 (EPISODE 4) | 2006.09.14 | 5:15PM | 0 |

FIG. 6

| CHANNEL | TITLE | DATE | TIME | RESERVATION |
|---|---|---|---|---|
| CH11 MBC | 6 O'CLOCK NEWS | 2006.09.11 | 6:00PM | 0 |
| CH11 MBC | 6 O'CLOCK NEWS | 2006.09.12 | 6:00PM | 0 |

FIG. 7

| CHANNEL | TITLE | DATE | TIME | RESERVATION |
|---|---|---|---|---|
| CH11 MBC | (Re) GOLD APPLE | 2006.09.18 | 3:00PM | O |

FIG. 8

| CHANNEL | TITLE | DATE | TIME | RESERVATION |
|---|---|---|---|---|
| CH10 OCN | CSI SEASON 1 (EPISODE 1) | 2006.09.11 | 5:15PM | O |
| CH11 MBC | 6 O'CLOCK NEWS | 2006.09.11 | 6:00PM | O |
| CH10 OCN | CSI SEASON 1 (EPISODE 2) | 2006.09.12 | 5:15PM | O |
| CH11 MBC | 6 O'CLOCK NEWS | 2006.09.12 | 6:00PM | O |
| CH10 OCN | CSI SEASON 1 (EPISODE 3) | 2006.09.13 | 5:15PM | O |
| CH10 OCN | CSI SEASON 1 (EPISODE 4) | 2006.09.14 | 5:15PM | O |

FIG. 9

METHOD FOR SCHEDULED-RECORDING OF PROGRAM AND IMAGE DISPLAY APPARATUS USING THE SAME

CROSS-REFERENCE TO RELATED APPLICATIONS

This application claims the benefit under 35 U.S.C. §119(a) of Korean Patent Application No. 10-2006-0115274, filed on Nov. 21, 2006, in the Korean Intellectual Property Office, the entire disclosure of which is hereby incorporated by reference.

BACKGROUND OF THE INVENTION

1. Field of the Invention

The present invention relates to a method for a scheduled-recording of a program and an image display apparatus using the same. More particularly, the present invention relates to a method for a scheduled-recording of a program, and an image display apparatus using the same, in which a program is scheduled and recorded by only a simple input when viewing a broadcast program.

2. Description of the Related Art

Image display apparatuses, such as televisions (TVs), display broadcast programs received from an external source through antennas. Additionally, image display apparatuses have the function to schedule and record broadcast programs.

Specifically, when the scheduled-recording function is selected, an image display apparatus may change the current channel to a channel on which the scheduled program is broadcast at the time when the broadcast program is received. When the image display apparatus is turned off, the image display apparatus may automatically turn on at the time when the broadcast program is received to display the scheduled broadcast program. Additionally, when the recording function is selected, the image display apparatus may record a selected broadcast program using recording devices or personal video recorders (PVRs), including recording media.

However, in a conventional image display apparatus, when a user desires to view a rebroadcast of a program currently being viewed or a series of programs having several dozens of episodes again at the next time, the user needs to know in advance the rebroadcast time or the time when the next episode is to be broadcast, and needs to set the title and recording time of the program on a scheduled-recording menu. Alternatively, the user searches for a program to be scheduled-recorded one program at a time from an electronic program guide (EPG) screen, to set the scheduled-recording function to the searched program or wait until the program is broadcast.

Figure 1:
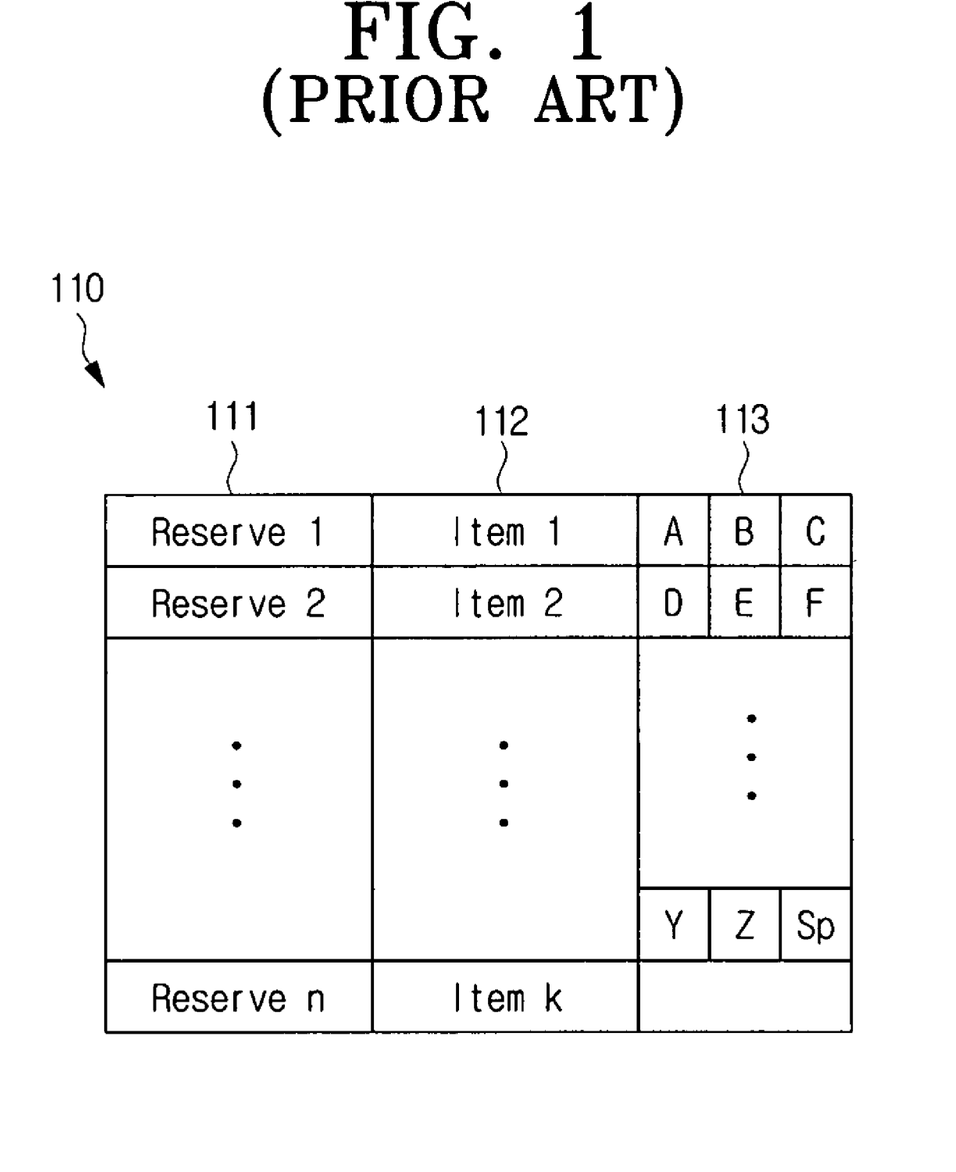
FIG. 1 is a view illustrating a conventional program scheduling method.

A conventional program scheduling method will be described below with reference to FIG. 1. In FIG. 1, a conventional image display apparatus provides a schedule set window 110 containing a scheduled item 111, an item list 112, and a keyboard 113.

A user enters specific characters through the keyboard 113 to set the scheduled item 111 and set details on the item list 112. When content corresponding to the scheduled item 111 and the individual scheduled item set on item list 112 are compared to information on the program being broadcast and correspond to each other, the image display apparatus may provide the program to the user at the time when the corresponding program is broadcast.

Accordingly, because a program is searched and the scheduled-recording is set through a separate scheduled-recording window, a user needs to know detailed information on the program to be scheduled-recorded. Additionally, the user needs to set the information for each program separately, which causes an inconvenience to the user.

Accordingly, a need exists for a method of simply and conveniently recording programs without requiring a user to perform a complicated search procedure.

SUMMARY OF THE INVENTION

Accordingly, an exemplary aspect of the present invention is to provide a method for a scheduled-recording of a program, and an image display apparatus using the same, in which the program may be set to be scheduled and recorded by only a simple input on the currently viewed program without a separate scheduled-recording window.

The foregoing and other objects and advantages are substantially realized by providing a method for a scheduled-recording of a program that comprises displaying a search menu for searching other programs related to a program being displayed, and scheduling the recording of at least one program from among programs searched according to search options selected from the search menu.

The search menu may be displayed when one of a search command, a scheduling command, a recording command, and a scheduled-recording command is input.

Other programs related to the program being displayed may be one program from among a program in a series including the program being displayed, a program with the same title as the program being displayed, and a rebroadcast of the program being displayed.

The scheduling the recording may comprise displaying a search list containing the programs searched according to search options selected from the search menu; and displaying a scheduled-recording list containing programs set to be scheduled-recorded, when at least one program among the searched programs is set to be scheduled-recorded in the search list.

The search list may comprise a field for setting at least one program among the searched programs to be scheduled, recorded, and scheduled-recorded.

The displaying the search list may comprise searching for programs with a title having a predetermined portion corresponding to a portion of characters forming a title of the program being displayed from a received electronic program guide (EPG), and generating a series search list including information on the searched programs to be displayed when a series search is selected from the search menu.

A portion of characters forming the title of the program being displayed may be the initial portion of the title.

The displaying the search list may comprise displaying a series edit window when a series edit search is selected from the search menu, searching programs with the same title as the program edited on the series edit window from the received EPG, and generating a series edit search list including information on the searched program to be displayed.

The displaying the search list may comprise searching for programs with the same title as the program being displayed from the received EPG, and generating an identical title search list including information on the searched program to be displayed when an identical title search is selected from the search menu.

Additionally, the displaying the search list may comprise searching for programs having the same title as the program being displayed and rebroadcast information from the received EPG, and generating a rebroadcast search list including information on the searched program to be displayed when a rebroadcast search is selected from the search menu.

According to another aspect of exemplary embodiments of the present invention, an image display apparatus is provided that comprises an on-screen display (OSD) generator for displaying a search menu, and a controller for controlling the OSD generator to display a search menu for searching for other programs related to a program being displayed and for scheduling the recording of at least one program from among programs searched according to search options selected from the search menu.

The controller may control the OSD generator to display the search menu when one of a search command, a scheduling command, a recording command, and a scheduled-recording command is input.

Other programs related to the program being displayed may be one program from among a program in a series including the program being displayed, a program with the same title as the program being displayed, and a rebroadcast of the program being displayed.

The controller may control the OSD generator to display a search list containing the programs searched according to search options selected from the search menu, and to display a scheduled-recording list containing programs set to be scheduled-recorded when at least one program among the searched programs is set to be scheduled-recorded in the search list.

The search list may comprise a field for setting at least one program among the searched programs to be scheduled, recorded, and scheduled-recorded.

The controller may search for programs with a title having a predetermined portion corresponding to a portion of characters forming a title of the program being displayed from a received electronic program guide (EPG), and control the OSD generator to generate a series search list including information on the searched programs to be displayed when a series search is selected from the search menu.

A portion of characters forming the title of the program being displayed may be the initial portion of the title.

The controller may control the OSD generator to display a series edit window when a series edit search is selected from the search menu, and may search for programs with the same title as the program edited on the series edit window from the received EPG. Additionally, the controller may control the OSD generator to generate a series edit search list including information on the searched program to be displayed.

The controller may search for programs with the same title as the program being displayed from the received EPG, and control the OSD generator to generate an identical title search list, including information on the searched program to be displayed, when an identical title search is selected from the search menu.

Additionally, the controller may search for programs having the same title as the program being displayed and rebroadcast information from the received EPG and control the OSD generator to generate a rebroadcast search list including information on the searched program to be displayed when a rebroadcast search is selected from the search menu.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above aspects and features of the present invention will be more apparent by describing certain exemplary embodiments of the present invention with reference to the accompanying drawings, in which.

Throughout the drawings, the same drawing reference numerals will be understood to refer to the same elements, features and structures.

DETAILED DESCRIPTION OF EXEMPLARY EMBODIMENTS

Certain exemplary embodiments of the present invention will now be described in greater detail with reference to the accompanying drawings.

The matters defined in the description, such as a detailed construction and elements thereof, are provided to assist in a comprehensive understanding of the embodiments of the invention and are merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

Figure 2:
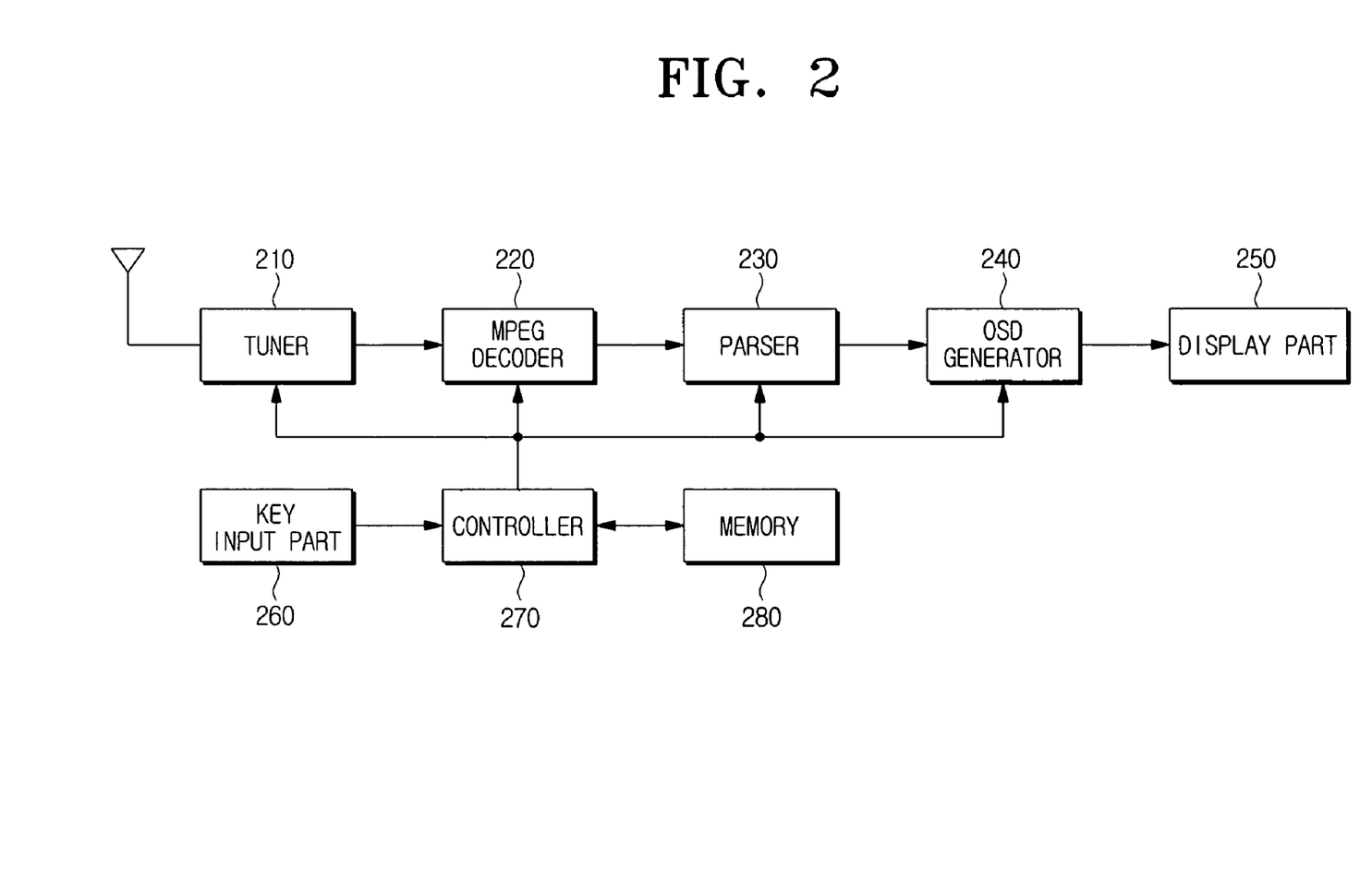
FIG. 2 is a block diagram of an image display apparatus according to an exemplary embodiment of the present invention.

FIG. 2 is a block diagram of an image display apparatus according to an exemplary embodiment of the present invention.

When a specific input is received while displaying a program being broadcast, the image display apparatus may provide a search window for setting the scheduled-recording of programs related to the program being displayed. Accordingly, a method is provided that enables a user to readily schedule and record the programs related to the program being displayed.

Referring to FIG. 2, the image display apparatus comprises a tuner 210, a Moving Picture Experts Group (MPEG) decoder 220, a parser 230, an on-screen display (OSD) generator 240, a display part 250, a key input part 260, a controller 270, and a memory 280.

The tuner 210 receives a broadcast program corresponding to a channel selected by a user.

The MPEG decoder 220 decodes the broadcast program received by the tuner 210. The parser 230 parses information on the broadcast program contained in the broadcast program decoded by the MPEG decoder 220.

The OSD generator 240 generates a search menu on the broadcast program decoded by the MPEG decoder 220 in graphics mode, and displays the generated search menu. Additionally, the OSD generator 240 generates and displays a search window and a search list according to search options selected from the search menu, and a scheduled-recording list according to items set in the search window and search list in graphics mode.

The display part 250 displays the search menu, search window, search list, and scheduled-recording list on the broadcast program by the OSD generator 240.

The key input part 260 includes a key for inputting a search command or a key for inputting a scheduled-recoding command, and a key for selecting the search options and setting items in the search window and search list. When a signal is input through the key included in the key input part 260, the key input part 260 may output a command corresponding to the signal to the controller 270.

When a search command or a scheduled-recording command is input through the key input part 260, the controller 270 may control the OSD generator 240 to generate a search menu to display the generated menu. Next, the controller 270 may store the information on the broadcast program being displayed in the memory 280. The information on the broadcast program being displayed is parsed by the parser 230, including for example, the title of the broadcast program.

When a search option selection command is input through the key input part 260, the controller 270 may control the OSD generator 240 to generate a search window and a search list in response to the input command to display the generated window and list. Additionally, when a command to set items in the search window or the search list is input through the key input part 260, the controller 270 may control the OSD generator 240 to generate a scheduled-recording list according to the input command to display the generated list.

The memory 280 stores the entire electronic program guide (EPG), that is, information on all programs broadcast within about 7 to 10 days, and stores the title of the broadcast program to which search commands or scheduled-recording commands are input.

Figure 3:
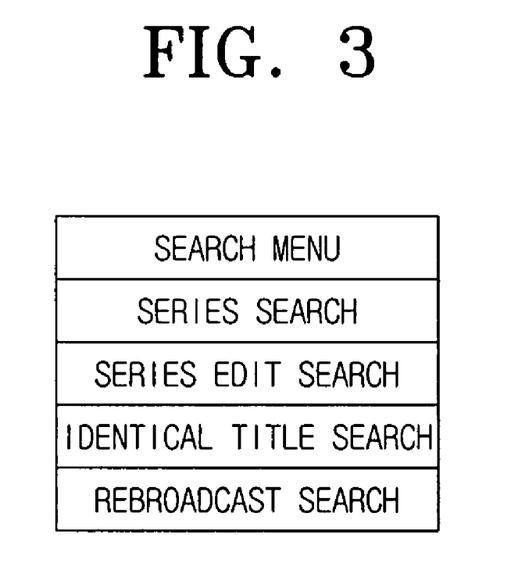
FIG. 3 is a view illustrating a search menu according to an exemplary embodiment of the present invention.

FIG. 3 is a view illustrating a search menu according to an exemplary embodiment of the present invention.

The search menu of FIG. 3 includes items relating to the series search, series edit search, identical title search, and rebroadcast search.

The series search is used to search for a series of the broadcast program being displayed when the broadcast program being displayed is a series having a plurality of episodes.

The series edit search is used to search for only the series including the broadcast program being displayed, among series for each season when the broadcast program being displayed has a series for at least one season, and a series having a plurality of episodes.

The identical title search is used to search for a program with the same title as the broadcast program being displayed. Programs having an identical title are generally broadcast in the same time slot, and thus, it is easy to search for a broadcast program to be broadcast in the same time slot.

The rebroadcast search is used to search for a rebroadcast of the broadcast program being displayed.

Figure 4:
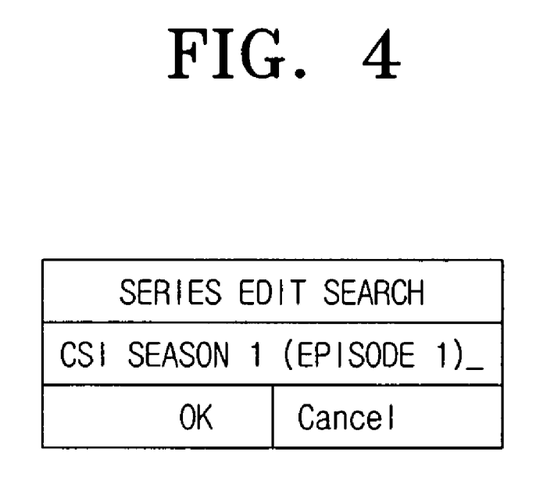
FIG. 4 is an exemplary view of a series edit search window when a series edit search is selected from the search menu of FIG. 3.

FIG. 4 is an exemplary view of a series edit search window when the series edit search is selected from the search menu of FIG. 3.

When a user chooses the series edit search from the search menu, the series edit search window is shown, as illustrated in FIG. 4. For example, when the broadcast program being displayed is "CSI Season 1 (Episode 1)", the series edit search window displays the title "CSI Season 1 (Episode 1)", which may be indicated by a cursor.

When a user deletes "(Episode 1)" and selects "OK" using the cursor placed on the title of the "CSI Season 1 (Episode 1)", a series corresponding to CSI season 1, that is, CSI Season 1 (Episode 1), CSI Season 1 (Episode 2), CSI Season 1 (Episode 3), and the like, may be searched.

Alternatively, when a user deletes "Season 1 (Episode 1)" and selects "OK" using the cursor placed on the title "CSI Season 1 (Episode 1)", all series corresponding to CSI, that is, CSI Season 1 (Episode 1), CSI Season 2 (Episode 3), CSI Miami Season 1 (Episode 5), or the like, may be searched. This situation is the same as the situation of choosing the series search item from the search menu. This is because when the series search is selected, programs in which about 50% or more characters in the initial portion of the titles correspond to each other are searched to determine similarities between the titles of programs.

The similarities between program titles used in searching for a series may be determined based on the correspondence of about 50% or more characters in the initial portion of the program titles, but this proportion is not fixed. To increase the accuracy of the series search, the similarity determination reference may be adjusted to greater than 50%, for example, 55%, 60%, or the like. Alternatively, to search for many series, the similarity determination reference may be adjusted to less than 50%, for example, 45%, 40%, or the like.

Figure 5:
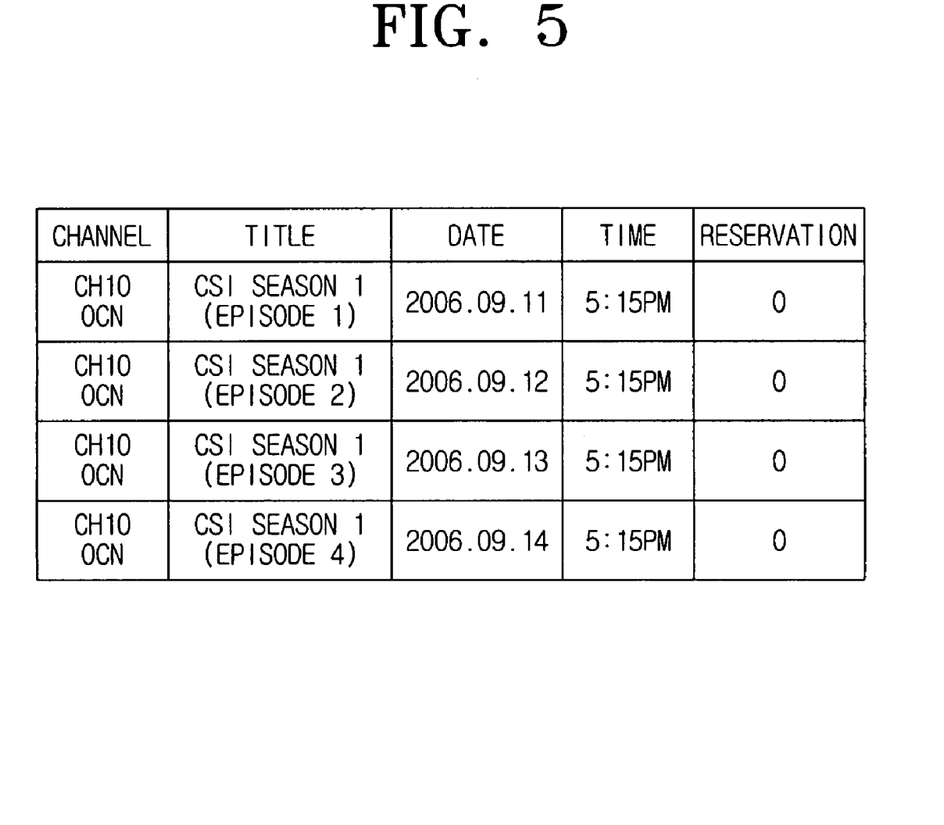
FIG. 5 is an exemplary view of a series search list when a series search is selected from the search menu of FIG. 3.

FIG. 5 is an exemplary view of a series search list when the series search is selected from the search menu of FIG. 3.

In FIG. 5, the series search list is shown under the situation of searching for a series corresponding to CSI season 1 from the series edit search window. The series search list includes information relating to the channel number and broadcasting station, that is, CH 10 OCN, on which the series corresponding to CSI season 1 is broadcast, the title of the series corresponding to CSI season 1, that is, CSI Season 1 (Episode 1), CSI Season 1 (Episode 2), CSI Season 1 (Episode 3), and CSI Season 1 (Episode 4), the date of broadcast, the time of broadcast, and a confirm schedule field.

Specifically, when the search command or the scheduled-recording command is input through the key input part 260 during display of "CSI Season 1 (Episode 1)", the controller 270 may control the OSD generator 240 to generate a search menu to display the generated menu. The controller 270 may then store the title "CSI Season 1 (Episode 1)" in the memory 280.

When the series edit search is selected from the search menu through the key input part 260, the controller 270 may control the OSD generator 240 to generate a series edit search window to display the generated window. When CSI season 1 is selected from the series edit search window, the controller 270 may search for a broadcast program with a title similar to "CSI Season 1" from the entire EPG stored in the memory 280. Additionally, the controller 270 may permit the OSD generator 240 to generate a series search list including information on the searched broadcast program to display the generated list.

In this situation, a user may determine whether scheduling is made in the confirm schedule field contained in the series search list.

Figure 6:
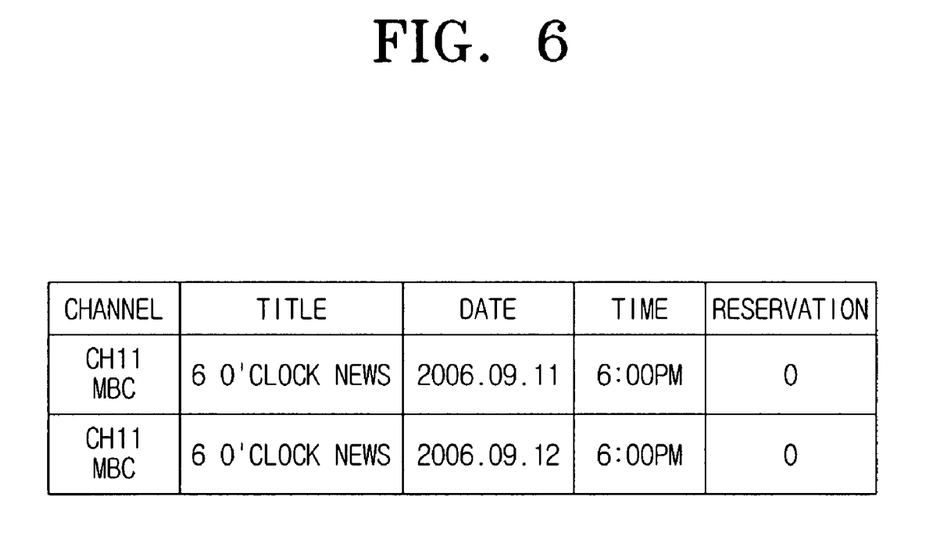
FIG. 6 is an exemplary view of an identical title search list when an identical title search is selected from the search menu of FIG. 3.

FIG. 6 is an exemplary view of an identical title search list when the identical title search is selected from the search menu of FIG. 3.

In FIG. 6, when the broadcast program being displayed is "6 o'clock News", the identical title search list may be shown when the identical title search is selected from the search menu.

Specifically, when the search command or the scheduled-recording command is input through the key input part 260 during display of "6 o'clock News", the controller 270 may store the title "6 o'clock News" in the memory 280. When the identical title search is selected from the search menu through the key input part 260, the controller 270 may search for a broadcast program with the same title as "6 o'clock News" from the entire EPG stored in the memory 280. Additionally, the controller 270 may permit the OSD generator 240 to generate an identical title search list including information on the searched broadcast program to be displayed.

In this situation, a user may also determine whether scheduling is made in the confirm schedule field contained in the identical title search list.

Figure 7:
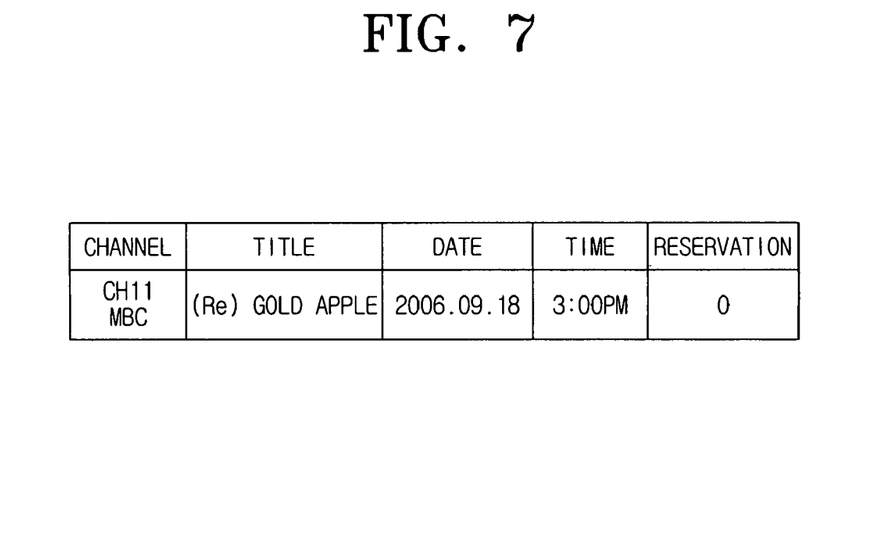
FIG. 7 is an exemplary view of a rebroadcast search list when a rebroadcast search is selected from the search menu of FIG. 3.

FIG. 7 is an exemplary view of a rebroadcast search list when the rebroadcast search is selected from the search menu of FIG. 3.

In FIG. 7, when the broadcast program being displayed is a drama titled "Gold Apple", the rebroadcast search list may be shown when the rebroadcast search is selected from the search menu.

Specifically, when the search command or the scheduled-recording command is input through the key input part 260 during display of "Gold Apple", the controller 270 may store the title "Gold Apple" in the memory 280. When the rebroadcast search is selected from the search menu through the key input part 260, the controller 270 may search for a broadcast program with the same title as "Gold Apple" from the entire EPG stored in the memory 280. Additionally, the controller 270 may determine whether the searched programs contain information indicating that the program is a rebroadcast, and search for a rebroadcast program. Subsequently, the controller 270 may permit the OSD generator 240 to generate a rebroadcast search list including information on the searched rebroadcast program to display the generated list.

Additionally, a user may determine whether scheduling is made in the confirm schedule field contained in the rebroadcast search list.

Characters "(Re)" may be added to the initial portion of the program title, for example "(Re) Gold Apple", to inform that the program is a rebroadcast. Accordingly, the controller 270 may compare the characters "(Re)" in the initial portion of the title to the remaining characters in the title, and determine that the program is a rebroadcast. A determination is made whether information relating to the rebroadcast contained in the broadcast program is present, and thus it is possible to determine that the program is a rebroadcast.

Figure 8:
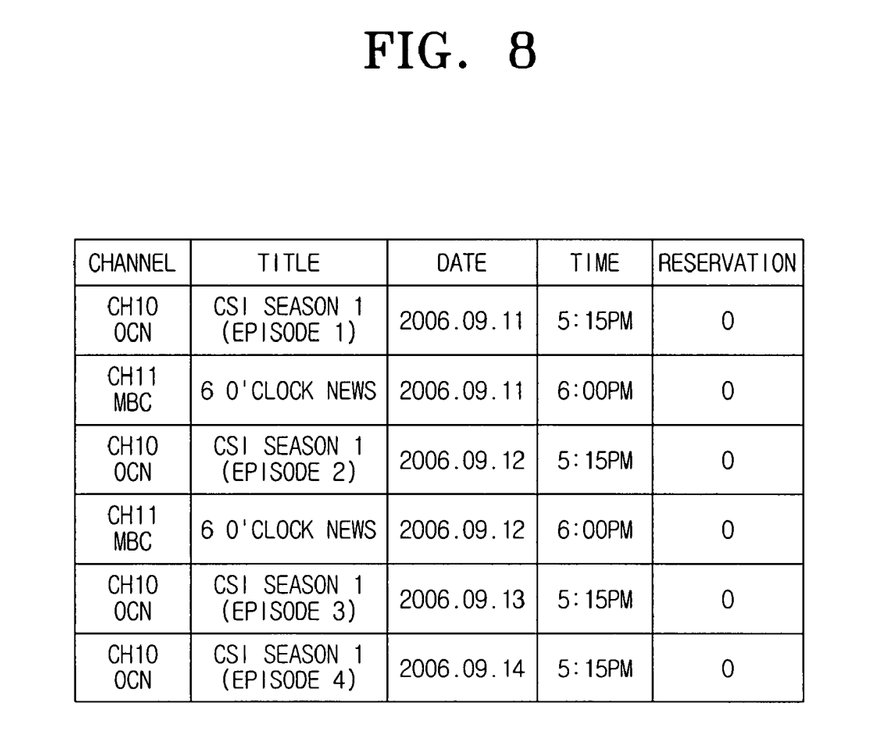
FIG. 8 is a view illustrating a scheduled-recording list created using a method for a scheduled-recording of a program in an image display apparatus according to an exemplary embodiment of the present invention.

FIG. 8 is a view illustrating a scheduled-recording list created using a method for a scheduled-recording of a program in an image display apparatus according to an exemplary embodiment of the present invention.

As shown in FIG. 8, the final schedule list is displayed that is generated according to whether scheduling is made in the search lists of FIGS. 5 to 7. On the scheduled-recording list, broadcast programs set to be scheduled are arranged chronologically.

Specifically, it is assumed that CSI Season 1 (Episode 1), CSI Season 1 (Episode 2), CSI Season 1 (Episode 3), and CSI Season 1 (Episode 4) are confirmed to be scheduled in the confirm schedule field of the series search list of FIG. 5; the "6 o'clock News on Sep. 11" and "6 o'clock News on Sep. 12" are confirmed to be scheduled in the confirm schedule field of the identical title search list of FIG. 6; and the schedule setting is not performed in the confirm schedule field of the rebroadcast search list of FIG. 7.

In this situation, the controller 270 may judge the broadcast programs set to be scheduled in the search lists of FIGS. 5 to 7, and control the OSD generator 240 to generate the arranged scheduled-recording list to display the generated list.

The present invention is not intended to be limited to the method for setting the schedule of broadcast programs as described above, but may be applied to methods for setting recording, scheduled-recording, and blocking of broadcast programs. Additionally, although the lists of FIGS. 5 to 8 including the confirm schedule fields have been illustrated above, the lists are only one example and may be implemented by including other set fields, such as recording, scheduled-recording, and blocking.

Figure 9:
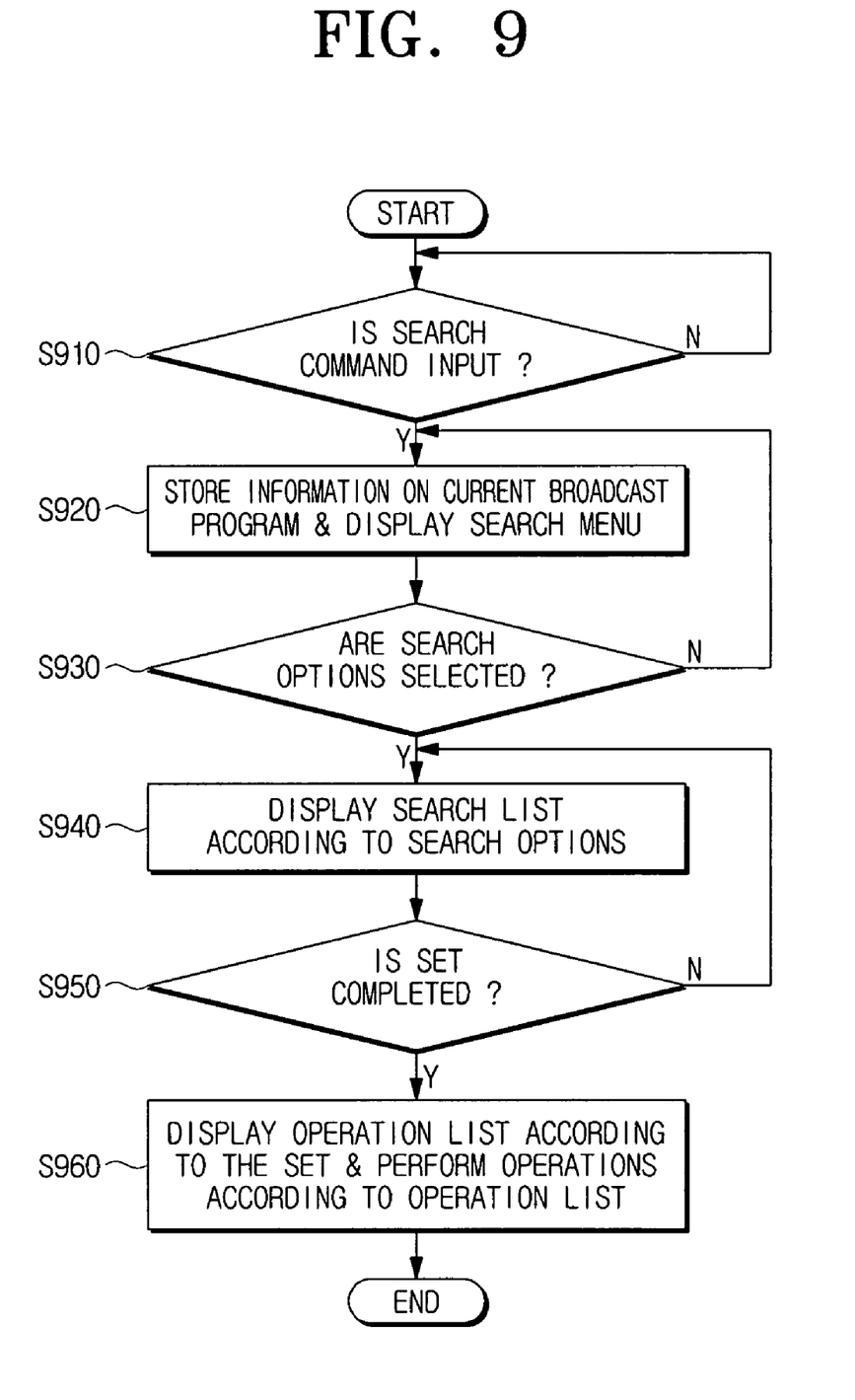
FIG. 9 is a flowchart of a method for a scheduled-recording of a program in an image display apparatus according to an exemplary embodiment of the present invention.

FIG. 9 is a flowchart explaining a method for a scheduled-recording of a program in an image display apparatus according to an exemplary embodiment of the present invention.

In FIG. 9, the controller 270 determines whether the search command is input through the key input part 260 in operation S910. The search command may be a specific command, such as a scheduling command, a recording command, a scheduled-recording command, or the like.

When it is determined that the search command is input, the controller 270 may store the information on the broadcast program being displayed, that is, the controller 270 may store the title in the memory 280, and control the OSD generator 240 to display the search menu in operation S920.

Additionally, the controller 270 determines whether the search options are selected from the search menu in operation S930. The search options may be selected by the up and down arrow keys and the OK key included in the key input part 260.

When it is determined that the search options are selected, the controller 270 may permit the OSD generator 240 to display a search list identifying the search result according to the selected search options in operation S940. The controller 270 may generate a search list including a confirmation field according to the command input in operation S910. For example, when the search command is received, the controller 270 may generate a search list so that all confirmation fields for the scheduling, recording, and scheduled-recording may be contained in the search list. Additionally, when the recording command is input, the controller 270 may generate a search list including the confirm recording field, and when the scheduled-recording command is input, the controller 270 may generate a search list including the confirm scheduled-recording field.

The controller 270 determines whether the settings are completed in the search list in operation S950. The settings may be performed for the scheduling, recording, and scheduled-recording, and may be made in the confirmation field contained in the search list. Additionally, the settings may be changed by using the left and right arrow keys or the OK and cancel keys included in the key input part 260.

When it is determined that the settings are completed, the controller 270 may control the OSD generator 240 to display an operation list according to the settings, and perform operations according to the operation list in operation S960. The controller 270 may perform a scheduling operation of the broadcast program set to be scheduled in the scheduled-recording list, and perform a recording operation of the broadcast program set to be recorded in the scheduled-recording list.

As described above, according to the exemplary embodiments of the present invention, it is possible to readily set a scheduled-recording without searching for each program separately from the EPG screen, even when a user desires to schedule and record a program with the same title as the program currently being viewed or a series of the program currently being viewed. Therefore, greater convenience is provided to the user.

The foregoing embodiments and advantages are merely exemplary and are not to be construed as limiting the present invention. The present teaching may be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for a scheduled-recording of a program, the method comprising:
    displaying a search menu for searching other programs related to a program being displayed, the search menu simultaneously displaying a plurality of search options, including a series search, a series edit search and an identical title search;
    displaying a list of programs searched according to search options selected from the search menu and setting a scheduled-recording of at least one of the programs searched;
    scheduling the recording of at least one of the programs set to be scheduled-recorded; and
    displaying a final scheduled-recording list including the at least one program set to be scheduled-recorded,
    wherein the scheduling the recording further comprises
    displaying the scheduled-recording list containing programs set to be scheduled-recorded when at least one program among the searched programs is set to be scheduled-recorded in the list of programs searched,
    wherein the displaying the list of programs searched comprises searching for programs having the same title as the program being displayed and rebroadcast information from a received electronic program guide (EPG), and
    wherein the rebroadcast information is text included in the program title to indicate that the program is a rebroadcast.

2. The method as claimed in claim 1, wherein the search menu is displayed when one of a search command, a scheduling command, a recording command, and a scheduled-recording command is input.

3. The method as claimed in claim 1, wherein other programs related to the program being displayed is one program from among a program in a series including the program being displayed, the program with the same title as the program being displayed, and the rebroadcast of the program being displayed.

4. The method as claimed in claim 1, wherein the list of programs searched comprises a field for setting at least one program among the searched programs to be scheduled, recorded, and scheduled-recorded.

5. The method as claimed in claim 1, wherein the displaying the list of programs searched comprises
    searching for programs with a title having a predetermined portion corresponding to a portion of characters forming a title of the program being displayed from the received EPG; and
    generating a series search list including information on the searched programs to be displayed when the series search is selected from the search menu.

6. The method as claimed in claim 5, wherein a portion of characters forming the title of the program being displayed is the initial portion of the title.

7. The method as claimed in claim 1, wherein the displaying the list of programs searched further comprises
    displaying a series edit window when the series edit search is selected from the search menu; and
    searching programs with the same title as the program edited on the series edit window from the received EPG, and generating a series edit search list including information on the searched program to be displayed.

8. The method as claimed in claim 1, wherein the displaying the list of programs searched comprises searching for programs with the same title as the program being displayed from the received EPG, and generating an identical title search list including information on the searched program to be displayed when the identical title search is selected from the search menu.

9. The method as claimed in claim 1, wherein the displaying the list of programs searched comprises generating a rebroadcast search list including information on the searched program to be displayed when a rebroadcast search is selected from the search menu.

10. An image display apparatus, comprising:
    an on-screen display (OSD) generator for displaying a search menu; and
    a controller for controlling the OSD generator to display the search menu for searching for other programs related to a program being displayed and for scheduling a recording of at least one program from among programs searched according to search options selected from the search menu, the search menu simultaneously displaying a plurality of
    wherein the controller controls the OSD generator to display a search list containing the programs searched according to the search options selected from the search menu and to display a scheduled-recording list containing programs set to be scheduled-recorded when at least one program among the searched programs is set to be scheduled-recorded in the search list,
    wherein the controller controls the OSD generator to display a final scheduled-recording list including the at least one program set to be scheduled-recorded,
    wherein when a rebroadcast search is selected from the search menu the controller searches for programs having the same title as the program being displayed and rebroadcast information from a received electronic program guide (EPG), and
    wherein the rebroadcast information is text included in the program title to indicate that the program is a rebroadcast, the rebroadcast search searching for rebroadcast text in the program title to determine whether the searched program is a rebroadcast program.

11. The apparatus as claimed in claim 10, wherein the controller controls the OSD generator to display the search menu when one of a search command, a scheduling command, a recording command, and a scheduled-recording command is input.

12. The apparatus as claimed in claim 10, wherein other programs related to the program being displayed is one program from among a program in a series including the program being displayed, the program with the same title as the program being displayed, and the rebroadcast of the program being displayed.

13. The apparatus as claimed in claim 10, wherein the search list comprises a field for setting at least one program among the searched programs to be scheduled, recorded, and scheduled-recorded.

14. The apparatus as claimed in claim 10, wherein the controller searches for programs with a title having a predetermined portion corresponding to a portion of characters forming a title of the program being displayed from the received EPG, and controls the OSD generator to generate a series search list including information on the searched programs to be displayed when the series search is selected from the search menu.

15. The apparatus as claimed in claim 14, wherein a portion of characters forming the title of the program being displayed is the initial portion of the title.

16. The apparatus as claimed in claim 10, wherein the controller controls the OSD generator to display a series edit window when the series edit search is selected from the search menu and searches for programs with the same title as the program edited on the series edit window from the received EPG, and controls the OSD generator to generate a series edit search list including information on the searched program to be displayed.

17. The apparatus as claimed in claim 10, wherein the controller searches for programs with the same title as the program being displayed from the received EPG, and controls the OSD generator to generate an identical title search list including information on the searched program to be displayed when the identical title search is selected from the search menu.

18. The apparatus as claimed in claim 10, wherein when the rebroadcast search is selected from the search menu further comprises controlling the OSD generator to generate a rebroadcast search list including information on the searched program to be displayed.

19. A method for a scheduled-recording of a program, the method comprising:
inputting a command to a controller;
displaying a search menu for searching other programs related to a program being displayed, the search menu simultaneously
displaying a plurality of search options, including a series search, a series edit search and an identical title search;
displaying a list of programs searched according to search options selected from the search menu and setting a scheduled-recording of at least one of the programs searched;
scheduling the recording of at least one of the programs set to be scheduled-recorded; and
displaying a final scheduled-recording list including the at least one program set to be scheduled-recorded,
wherein the scheduling the recording further comprises
displaying the scheduled-recording list containing programs set to be scheduled-recorded when at least one program among the searched programs is set to be scheduled-recorded in the list of programs searched,
wherein the displaying the list of programs searched comprises searching for programs having the same title as the program being displayed and rebroadcast information from a received electronic program guide (EPG), and
wherein the rebroadcast information is text included in the program title to indicate that the program is a rebroadcast.

20. The method as claimed in claim 19, wherein the inputting the command comprises inputting a search command, a scheduling command, a recording command, or a scheduled-recording command.

21. The method as claimed in claim 19, further comprising the search menu for searching other programs related to a program being displayed in response to the command being input from the controller.

22. The method as claimed in claim 21, wherein other programs related to the program being displayed is one program from among a program in a series including the program being displayed, the program with the same title as the program being displayed, and the rebroadcast of the program being displayed.

23. The method as claimed in claim 19, wherein the list of programs searched comprises a field for setting at least one program among the searched programs to be scheduled, recorded, and scheduled-recorded.

24. The method as claimed in claim 19, wherein the displaying the list of programs searched comprises
searching for programs with a title having a predetermined portion corresponding to a portion of characters forming a title of the program being displayed from the EPG; and
generating a series search list including information on the searched programs to be displayed when the series search is selected from the search menu.

25. The method as claimed in claim 24, wherein a portion of characters forming the title of the program being displayed is the initial portion of the title.

26. The method as claimed in claim 19, wherein the displaying the list of programs searched further comprises
displaying a series edit window when the series edit search is selected from the search menu; and
searching programs with the same title as the program edited on the series edit window from the received EPG, and generating a series edit search list including information on the searched program to be displayed.

27. The method as claimed in claim 19, wherein the displaying the list of programs searched comprises searching for programs with the same title as the program being displayed from the received EPG, and generating an identical title search list including information on the searched program to be displayed when the identical title search is selected from the search menu.

28. The method as claimed in claim 19, wherein the displaying the list of programs searched comprises generating a rebroadcast search list including information on the searched program to be displayed when a rebroadcast search is selected from the search menu.

* * * * *